United States Patent [19]

Gorshe

[11] Patent Number: 5,510,786
[45] Date of Patent: Apr. 23, 1996

[54] CMI ENCODER CIRCUIT

[75] Inventor: Steven S. Gorshe, Beaverton, Oreg.

[73] Assignee: NEC America, Inc., Melville, N.Y.

[21] Appl. No.: 231,779

[22] Filed: Apr. 25, 1994

[51] Int. Cl.$^6$ ............................................. H03M 5/12
[52] U.S. Cl. ............................................. 341/73
[58] Field of Search .......................... 341/73, 68, 94

[56] References Cited

U.S. PATENT DOCUMENTS

| 4,189,621 | 2/1980 | Scott . |
| 5,107,263 | 4/1992 | Kim et al. . |
| 5,113,187 | 5/1992 | Gorshe . |

*Primary Examiner*—Brian K. Young
*Attorney, Agent, or Firm*—Sughrue, Mion, Zinn, Macpeak & Seas

[57] ABSTRACT

A Coded Marked Inversion (CMI) encoding circuit having a completely synchronous and digital implementation for encoding a stream of digital data in non-return-to-zero (NRZ) format into the CMI format. The encoding circuit includes a clock for providing a clock signal having a certain period, an input circuit for obtaining two samples of the NRZ data during each clock period, and a state machine which, in response to the two samples of the NRZ data, produces CMI encoded data. In a more advanced implementation, the encoding circuit includes error encoding circuitry for detecting errors in the incoming samples of NRZ data. The encoding circuit then outputs data indicative of the rate at which errors are received.

23 Claims, 3 Drawing Sheets

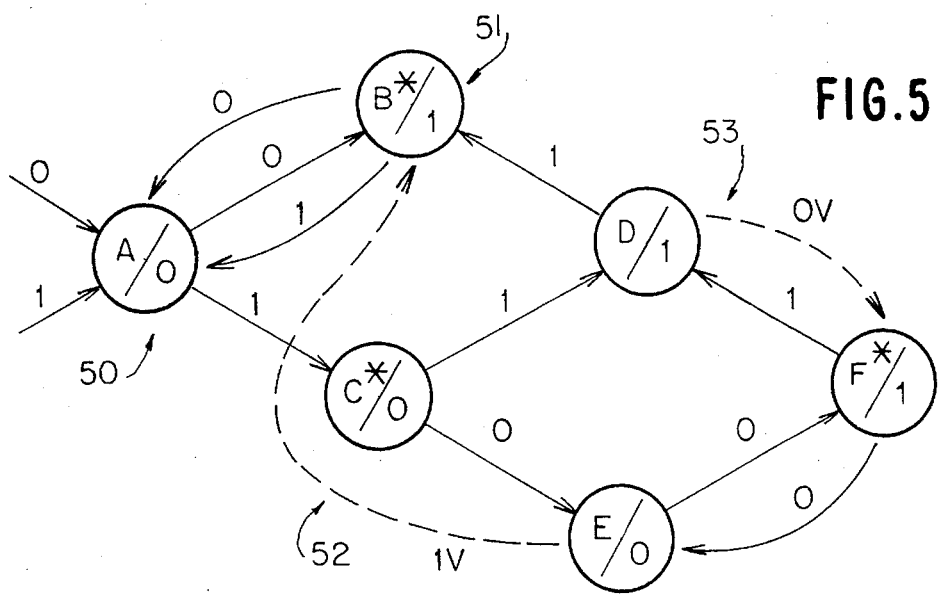
FIG. 5
FIG. 6
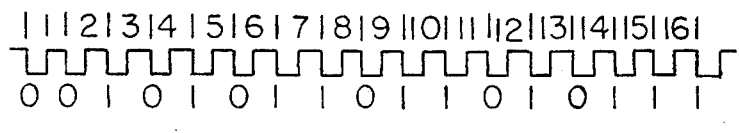
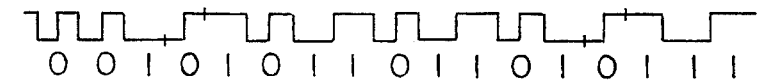

CM I ENCODER CIRCUIT

BACKGROUND OF THE INVENTION

The present invention relates to digital data encoding circuitry. More particularly, the present invention relates to a synchronously operated digital state machine circuit for encoding a succession of data bits from a Non-Return-to-Zero (NRZ) format to a Coded Marked Inversion (CMI) format.

In applications relating to the transmission of digital data from a transmitter to a receiver via an optical fiber link, for example, the format of the transmitted optical signal is critical in maintaining the integrity of the data. The format must permit the decision circuity in the receiver to extract precise timing information from the incoming optical signal. As is well known, timing serves three essential purposes, namely, allowing the receiver to sample the signal at the time the signal-to-noise ratio is a maximum, maintaining the proper pulse spacing, and indicating the start and end of each timing interval.

In addition, since errors resulting from noise and distortion can occur in the signal detection process, it may be desirable for the optical signal to have an inherent error-detecting capability. These features can be incorporated into the data stream by encoding the signal according to, for example, the Coded Marked Inversion or CMI format, which is a well-known technique.

The CMI format is a two-level line code in which digital data is converted into a pair of data bits. An example of a stream of digital data converted from the NRZ format to the CMI format is shown in FIG. 1. Specifically, an NRZ data bit of "0" is converted into a pair of data bits "0,1" and an NRZ data bit of "1" is converted alternately into a pair of data bits "0,0" and "1,1". The pair of data bits "1,0" is, by definition, an illegal combination. The converted pair of data bits (i.e., "0,1" "0,0", or "1,1") is transmitted within the same clock period, that is, time frame or data period in which the NRZ digital data is applied to the encoding unit.

In general, circuits or transmitters which encode a stream of digital data from the NRZ format to the CMI format are known. For example, U.S. Pat. No. 4,189,621 to Scott describes a device for encoding NRZ data into the CMI format. Scott discloses a circuit providing first, second, and third signal channels and an output gating circuit. The first signal channel includes an input connected to receive clock-related pulses and a delay circuit for delaying the clock-related pulses by a predetermined amount of time. The second signal channel includes an input connected to receive the clock-related pulses, an input connected to receive NRZ signals to be encoded in the CMI format, and other logic for deriving from the input NRZ signals a sequence of signals related to Return-to Zero (RZ) signals divided by two. The third signal channel is connected to receive NRZ signals and to derive signals related to these NRZ signals. The output gating circuit is connected to receive the signals from the three signal channels for logically combining the output signals from the second and third signal channels in order to derive a sequence of control signals to be supplied to a clock switching circuit connected to the first signal channel. The delay caused by the delay circuit to the clock-related pulses from the first signal channel relative to the delay of the control signals from the second and third signal channels is approximately plus/minus a quarter clock period. This delay circuit presents a major disadvantage in the Scott circuit.

Typically, delay circuits, particularly those used for delaying clock signals as in Scott, introduce many uncertainties in digital circuits, and such circuits are considered inferior to a completely synchronous circuit. Moreover, components of a delay circuit require very precise tolerances and, in general, are more expensive than in synchronous circuits. Accordingly, synchronous designs are preferred.

The device of Scott is further disadvantageous in that no means of minimizing the effects of noise is provided.

U.S. Pat. No. 5,107,263 to Kim et al. is another patent relating to an encoding circuit for converting NRZ data to CMI format. Kim et al., like Scott, also utilizes a delay circuit for encoding the incoming stream of NRZ data to CMI format. Kim et al. therefore suffers from some of the same disadvantages as does the circuitry disclosed by Scott.

Lastly, U.S. Pat. No. 5,113,187 to the same inventor, Gorshe, and commonly assigned as the present application, relates to a CMI encoder circuit having a completely synchronous and digital implementation for encoding a stream of NRZ digital data in CMI format. This encoder was constructed in the form of a state machine having both legal and illegal states. While the state machine described in U.S. Pat. No. 5,113,187 avoids the use of delay circuits and components as used in both Scott and Kim et al., it nevertheless has disadvantages. In particular, the encoder described in this earlier patent includes a state machine having both a set of legal states and illegal states. Once the state machine transitions into one of the illegal states, it remains there until the illegal state condition is detected. Thus, the encoder required additional hardware components for detecting when the state machine enters one of the illegal states and for returning the state machine back to a legal state.

SUMMARY OF THE INVENTION

It is therefore an object of the present invention to provide a digital circuit for encoding a stream of NRZ data into the CMI format which is free of the above-mentioned problems and disadvantages.

It is a further object of the present invention to provide as the digital circuit for encoding a stream of NRZ data into the CMI format a state machine having only a set of legal states and no illegal states.

It is yet a further object of the present invention to provide a CMI encoder which outputs information encoded into the CMI data which information is indicative of the rate of errors detected by the CMI encoder.

The above and other objects of the invention are accomplished by an apparatus for encoding non-return-to-zero (NRZ) data into Coded Marked Inversion (CMI) format. The apparatus includes a clock which generates a clock signal of a predetermined period, input means, coupled to the clock, for sampling the NRZ data during each period of the clock, and a state machine, coupled to the input means for receiving samples of the NRZ data, and encoding the samples of NRZ data into CMI format, the state machine comprising first means for producing in response to the NRZ data a first value, and second means for producing in response to the NRZ data and the first value, a second value, wherein the first and second values represent the sample of NRZ data in CMI format.

The above and other objects of the invention are further accomplished by a method of encoding non-return-to-zero (NRZ) data into Coded Marked Inversion (CMI) format. The method include the steps of providing a clocking signal having a predetermined period, obtaining a first sample of the NRZ data during the predetermined period, producing a first value in accordance with the first sample, obtaining a second sample of the NRZ data during the predetermined period, producing a second value in accordance with the first value and the sample, and combining the first and second values to generate a CMI coded value, and outputting the CMI coded value.

Even further, the above and other objects and advantages of the present invention are accomplished by an apparatus for encoding non-return-to-zero (NRZ) data into Coded Marked Inversion (CMI) format. The apparatus includes a clock for providing a clock signal having a predetermined period, an input circuit responsive to the clock signal and receives the NRZ data, the input circuit outputting at least one sample of the NRZ data during each period of the clock signal, a state machine coupled to the input circuit for receiving the sample of NRZ data, the state machine having a predetermined number of states, each of which outputs a first or second value, the state machine being operative to transition between different ones of the predetermined number of states to produce a combination of the first and second values, the combination represents the sample of NRZ data in CMI format.

The above and other objects, features, and advantages of the present invention will become more apparent from the following detailed description taken in conjunction with the accompanying drawings.

BRIEF DESCRIPTION OF THE DRAWINGS

FIG. 5 shows a state transition diagram of the second preferred embodiment of FIG. 4.

FIG. 6 illustrates a timing diagram of the first and second embodiments of the present invention.

DETAILED DESCRIPTION OF PREFERRED EMBODIMENTS

Figure 1:
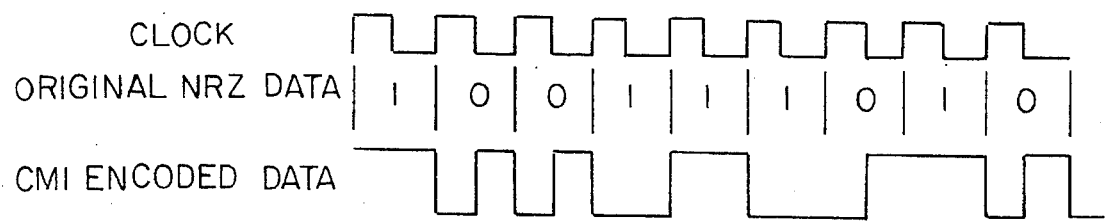
FIG. 1 illustrates a timing diagram representing a stream of NRZ data being encoded into the CMI format.
Figure 2:
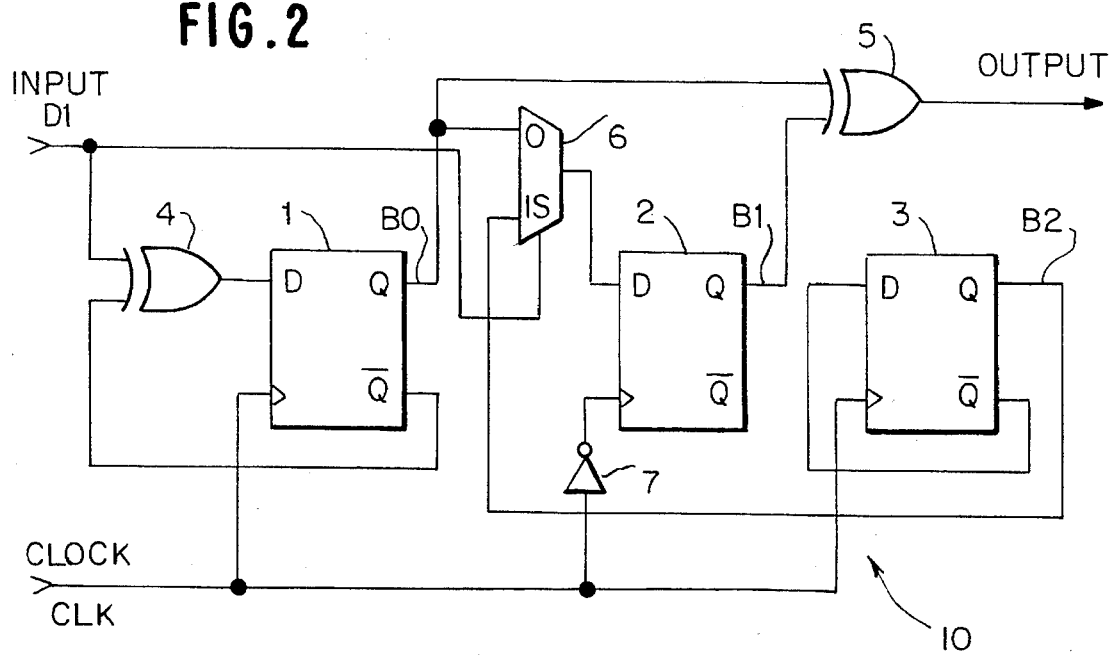
FIG. 2 illustrates a detailed schematic circuit diagram of a CMI encoder according to a first preferred embodiment of the present invention.

FIG. 2 illustrates a CMI encoder circuit according to a first embodiment of the present invention. Referring to FIG. 2, a stream of digital data D1 in NRZ format is supplied to the CMI encoder circuit 10, which provides at its output CMI encoded data. The CMI encoder circuit includes three D-type flip-flops 1, 2, 3, two exclusive-OR circuits 4, 5, and one multiplexer circuit 6. The CMI encoder circuit is constructed as follows.

The input stream of digital data D1 is applied to a first input of the exclusive-OR circuit 4 and to a select input SEL of the multiplexer 6. An output of the exclusive-OR circuit 4 is coupled to a D-input of the first flip-flop 1, whose inverting output is fed back to a second input of the exclusive-OR circuit 4. The non-inverting output of the flip-flop circuit 1 is coupled to a first input of the multiplexer 6 and into a first input of the exclusive-OR circuit 5. The output of the multiplexer 6 is coupled to a D-input of the second flip-flop circuit 2, whose non-inverting output is coupled to a second input of the exclusive-OR circuit 5. The third flip-flop 3 is configured to toggle between high and low logic values as its inverting output is tied to the D-input. The non-inverting output is fed back to a second input of the multiplexer circuit 6.

As shown in FIG. 2, each of the first, second, and third flip-flops have a clock input coupled to a clock signal CLK; the clock input of the second flip-flop 2 being coupled to the clock signal CLK via an inverting circuit 7.

Figure 3:
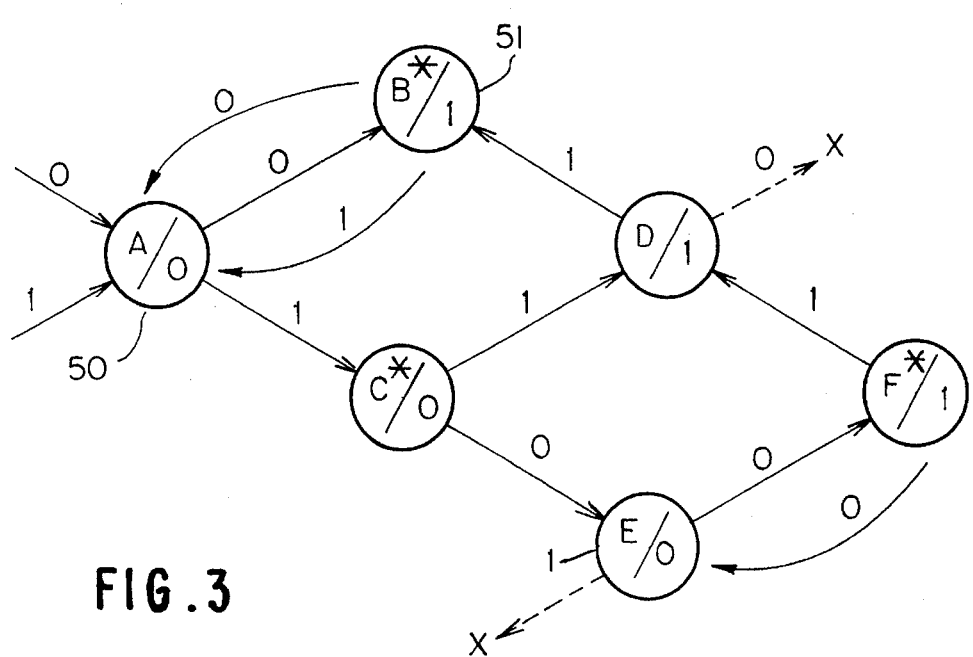
FIG. 3 shows a state transition diagram of the first preferred embodiment of FIG. 2.

The CMI encoder as described above functions as a state machine having six states, all of which constitute legal states. FIG. 3 illustrates a state transition diagram in which the six legal states are labelled alphabetically from A through F. Operation of the CMI encoder will next be described with further reference to FIG. 6 and Table 1.

As described above, the CMI format requires that each bit of the input NRZ data be encoded into a pair of bits, wherein an NRZ data sample of "0" is encoded into the "0,1" bit pair, and an NRZ data sample of "1" is encoded alternately between the bit pairs of "0,0" and "1,1".

According to the present invention, the CMI encoder samples the input NRZ data twice during each bit period, and outputs the appropriate bit pair. The effect of sampling the NRZ data twice during a bit period simplifies the CMI encoder circuitry by avoiding the use of a component for storing the sample in order to provide the CMI encoded output.

The state transition diagram of FIG. 3 illustrates all possible transitions from one state to another state. Specifically, each bit period is divided into a first half and a second half. In the first half, the state machine will enter one of the states A, D, and E, and, in the second half, the state machine will enter one of the states B, C, and F. In FIG. 3, within in each circle a letter (e.g., A–F) and numeral ("0" or "1") are designated (e.g., A/0). For states B, C, and F, an asterisk is used to indicate second half states. This combination of a letter, numeral, and in some cases an asterisk identifies the state and the output by the state machine during the first or second half of each bit period. For example, reference numeral 50 designates state A, which will output a "0" during the first half of a bit period. On the other hand, reference numeral 51 designates state B, which will output a "1" during the second half of a bit period.

An arrow pointing towards a state and labeled as "0" or "1" represents an input NRZ data value of "0" or "1" respectively, that is sampled by the CMI encoder 10. Inputs to the states A, D, and E represent the samples of the NRZ data during the first half of the bit period, while inputs to the states B, C, and F represent samples by the state machine during the second half the bit period.

Table 1 lists the data values for each of the states A–F for the non-inverting outputs $B_0$, $B_1$, $B_2$ of each of the flip-flops 1, 2, 3, respectively. Table 1 further identifies the inputs I and outputs O for the flip-flops as well as the clock edge upon which the outputs of the flip-flops assume the indicated values for the present state.

Next, a description of the operation of the CMI encoder will be provided for the case when a stream of input NRZ data having a bit pattern as set forth in FIG. 6 is received.

For this example, it is assumed that there is no noise to corrupt the input NRZ data as sampled by the CMI encoder. Therefore, the first half and second half samples of the input NRZ data will equal each other.

During the first bit period 1, the input NRZ data equals "0" and thus entering state A, a "0" is output by the CMI encoder during the first half of the first bit period. Since a "0" is also sampled during the second half, the state machine transitions from state A to state B, which produces a "1" as the output. Thus, the CMI encoded pair equals "0,1" representing the input NRZ data of "0" during bit period 1.

During the second bit period 2, a "0" is again received on the input so that, beginning from the last state (i.e., state B) of the last bit period (i.e., the first bit period), the CMI encoder transitions back to state A (following the lead line labeled 0, which connects state B to state A) so that a "0" is output during the first half of the second bit period. Next, because the second sample of NRZ data is also a "0" the state machine transitions back to state B from state A so that a "1" is output during the second half of the bit period 2 by the CMI encoder. The bit pair of "0,1" is thus output by the CMI encoder during the second bit period.

During bit period 3, the CMI encoder receives a logical "1" as the input NRZ data. Again, the state machine transitions back to state A from state B so that a "0" is output during the first half of the bit period 3. Next, as a "1" is again sampled during the second half of the current bit period, the state machine transitions from state A to state C at which point a "0" is output during the second half. Therefore, the state machine outputs the CMI bit pair of "0,0" representing the input NRZ data of "1".

Next, during the fourth bit period, a "0" is received as the input NRZ data, so that the state machine transitions from state C to state E thereby outputting a "0" during the first half of the bit period. Next, the state machine transitions from state E to state F in response to sampling a "0" during the second half so that a logical "1" is output during the second half of the fourth bit period.

Then, a "1" is received by the CMI encoder during bit period 5 so that the state machine transitions from the last state F to the state D at which point a "1" is output during the first half. The state machine then transitions from state D to state B so that a "1" is output during the second half; thus, providing the combination of "1,1" to represent the NRZ data of "1".

The CMI encoder continues to operate in the manner described above in order to encode the incoming stream of input NRZ data. Moreover, without the introduction of any errors or noise into the system, the CMI encoder will continue properly to encode the incoming data.

However, because two samples of NRZ data are taken during each bit period, there exists the possibility that the two samples will differ. This typically is the result of noise on the input data line. As a result, the CMI encoder may output code violations (i.e., failing to output the proper pair of bits for an input NRZ data sample of "1" such as consecutive pairs of "0,0" or consecutive pairs of "1,1" instead of alternating between the two), or output the illegal bit pair "1,0".

There are several advantages to taking two samples during each bit period. For instance, by taking two samples of the incoming NRZ data during a single bit period, the CMI encoder is capable of detecting noise in the incoming stream of NRZ data. That is, when the two samples differ, the CMI encoder knows that one of the samples has been corrupted by noise. Second, once noise is detected, the CMI encoder can output information indicating not only that noise is present, but also the rate at which noise is affecting the incoming data. This aspect of the invention is discussed in more detail below with respect to the second preferred embodiment. Third, sampling the incoming data on both edges of the clock signal, eliminates the need for an additional hardware component for buffering the sample taken at the beginning of the bit period for use during the second half of the bit period.

The following examples represent situations which arise when the first half sample and the second half sample of the NRZ data differ due to noise or any other reason. This is the only situation in which CMI encoder will output either illegal codes (i.e., the bit pair of "1,0") or code violations (i.e., outputting consecutive bit pairs of "1,1" or "0,0" instead of alternating between these two pairs).

When the samples differ such that a "0" is sampled during the first half and a "1" is sampled during the second half of a bit period, the CMI encoder would proceed from state A to state C or from state E to an undefined state. In these two instances, the state machine will either output a CMI pair of "0,0" (representing a NRZ data value of "1") or a CMI pair of "0,1" (representing an NRZ data value of "0"), but will not output the illegal CMI code pair of "1,0". Moreover, if the previous CMI bit pair for an NRZ data value of "1" was "0,0" then the output of "0,0" due to the error would result in two consecutive pairs of "0,0" being generated And, this is a code violation Thus, it is important to note that even when an error is detected a code violation will not occur every time, but only sometimes.

The only instance when the CMI encoder will output an illegal code is when an NRZ data value of "1" is sampled during the first half of the bit period and an NRZ data value of "0" is sampled during the second half of the bit period, and the state machine was previously in state C or state F. In this case, the state machine will transition from state C or state F to state D during the first half of the bit period (which is the only state that outputs a "1" during the first half of the bit period), and then to an undefined state during the second half of the bit period. The resulting combination will generate the bit pair of "1,0" which is an illegal pair.

Table 3 summarizes the performance of the CMI encoder according to the first embodiment. The table shows that when the first and second half samples of the input NRZ data values differ, that either 33% or 67% of those mismatches results in an error being transmitted from the CMI encoder. Of these errors, 67% are illegal codes, and only 33% are code violations.

It is further noted with respect to the first embodiment, that proceeding from state D or state E to an undefined state which is denoted as X in FIG. 3, that the next state of the CMI encoder will be a defined or valid, legal state. Thus, while the CMI encoder includes an undefined state, the CMI encoder automatically returns to a legal state for the next bit period. Unlike the encoder taught by U.S. Pat. No. 5,113,187, the present CMI encoder does not remain stuck in an illegal state or stuck transitioning between illegal states.

Figure 4:
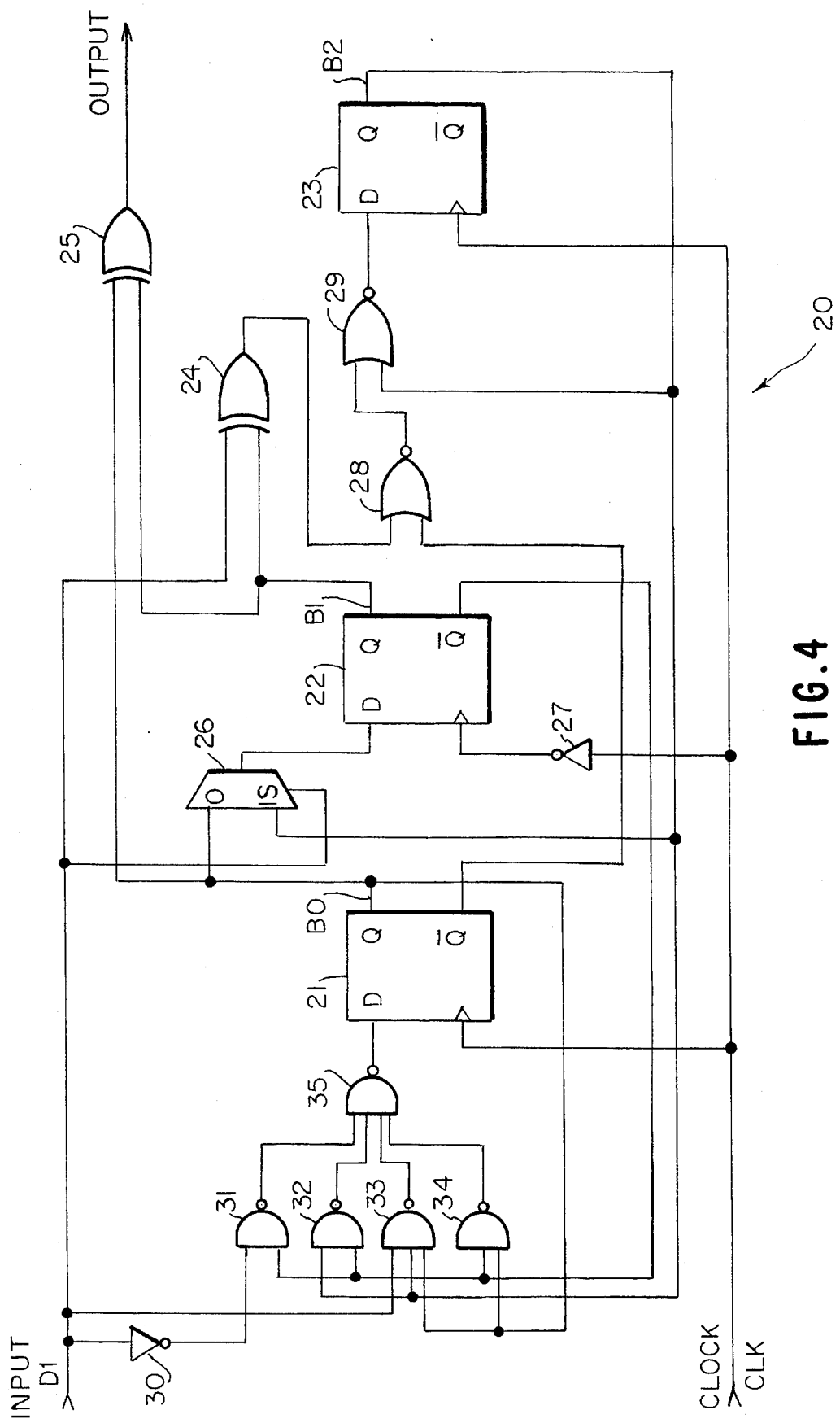
FIG. 4 illustrates a detailed schematic circuit diagram of a CMI encoder having advanced error coding capabilities according to a second preferred embodiment of the present invention.

A second embodiment of the present invention is provided, and it is illustrated in FIG. 4. The second preferred embodiment provides a CMI encoder having additional error coding circuitry, which has certain advantages over the first embodiment. For example, considering all cases in which the first and second half samples of the NRZ data differ, the second embodiment will transmit approximately 50% of these as code violations. Thus, on average, when the first and second half samples of the input NRZ data differ, the percentage of code violations received by the receiver will be proportional to the cases in which the encoder incorrectly chooses which of the two samples is correct. This is an intelligent way of handling the errors, that is, the CMI encoder outputs information indicative of the incoming error rate.

Moreover, the second embodiment never transmits the illegal CMI code of "1,0" which may be beneficial to receiver timer recovery circuits. That is, not all CMI decoders have the capability of properly handling the illegal code of "1,0".

Referring to FIG. 4 in detail, the CMI encoder 20 according to the second embodiment includes, as in the first embodiment, three D-type flip-flops 21, 22, 23, synchronously clocked by a clocking signal CLK. A combination of outputs of the three flip-flops are provided to an exclusive-OR circuit 25 to provide the CMI encoded data.

More specifically, the input NRZ data is applied to a first input of the NAND gate 31 via the inverter 30, a first input of the NAND gate 33, a select input of the multiplexer 26, and the first input of the exclusive-OR gate 24. Second inputs of each of the NAND gates 31, 32, and the first input of NAND gate 34 are coupled to the inverting output of the second flip-flop 22. A second input of the NAND gate 32 and a third input of the NAND gate 33 together with the second input of the multiplexer 26 and NOR circuit 29 are tied to the non-inverting output of the third flip-flop 23. Each output of the NAND gates 31–34 are coupled to respective inputs of the NAND gate 35, whose output is coupled to the D-input of the first flip-flop 21. The non-inverting output of the first flip-flop 21 is coupled to a first input of the multiplexer 26, a first input of the exclusive-OR circuit 25, a third input of the NAND gate 33, and a second input of the NAND gate 34. The inverting output of the flip-flop 21 is coupled to a second input of the NOR circuit 28.

At the second stage, the output of the multiplexer 26 is coupled to the D-input of the second flip-flop 22, whose non-inverting output is coupled to each of the second inputs of the exclusive-OR circuits 24, 25. The output of the exclusive-OR circuit 24 is coupled to a first input of the NOR circuit 28, whose output is coupled to a first input of the NOR circuit 29.

At the third stage, the output of the NOR circuit 29 is coupled to the D-input of the third flip-flop 23, whose non-inverting output is fed back to the second input of the NOR circuit 29 as described above. The exclusive-OR circuit 25 provides the CMI encoded output.

As in the first embodiment, the second embodiment of the CMI encoder functions as a state machine composed of six states. FIG. 5 illustrates a state transition table, while Table 2 represents a state table of the CMI encoder 20 as illustrated in FIG. 4.

Operation of the CMI encoder according to the second embodiment is identical to operation of the first embodiment except for the following. According to the second embodiment, as illustrated in FIG. 5 when compared with FIG. 3, the second embodiment transitions from state E to state B and state D to state F, rather then transitioning to an undefined state X as in the first embodiment. The practical result of this difference is that the CMI encoder 30 never transmits the illegal CMI code of "1,0" upon a mismatch in the sampled input NRZ data during the first and second half of a bit period. Rather, as summarized in Table 3, of all the errors detected by the CMI encoder 20, fifty percent are transmitted as code violations, and the other fifty percent are properly encoded. The fact that code violations are transmitted fifty percent of the time provides an indication of the amount of errors detected by the CMI encoder. A receiver or other device can therefore monitor the information (e.g., the number of code violations) output by the CMI encoder in order to determine the amount or rate of such errors detected by the CMI encoder.

Thus, upon a mismatch in the sampled input NRZ data during the first and second half of a bit period, the additional logic in the CMI encoder of FIG. 4 provides the capability of transmitting code violations or the proper code instead of the illegal CMI code, with the number of code violations transmitted being proportionate to the amount of errors detected by the CMI encoder. These aspects are more clearly understood by the following two examples.

For the first example, assume that in the previous bit period the state machine output the CMI code of "0,0" representing an NRZ data value of "1" and the second half state was state C. Also assume that in the next or present bit period that the two samples of the NRZ data equal "0,1" (i.e. an error or mismatch). The state machine thus proceeds from state C in the previous bit period to state E for the first half of the present bit period. During the second half, the state machine will transition to state B, along dash line 52. The CMI coded output will be the bit pair of "0,1" which represents an NRZ data value of "0" and which may or may not be correct; the encoder cannot determine which one of the two samples was in fact correct. In the next bit period, assuming that the two samples of NRZ data equal "1,1" the state machine will transition from state B to state A and then to state C, thus outputting the CMI coded pair of "0,0". This results in a code violation as the CMI coded pair of "0,0" was output two consecutive times.

In the second example, again assume that in the previous bit period the state machine outputs the CMI code of "0,0" representing an NRZ data value of "1" and the second half state was state C. This time, however, assume that in the next or present bit period that the two samples of the NRZ data equal "1,1". The state machine thus proceeds from state C in the previous bit period to state D for the first half and state B for the second half of the present bit period to output the CMI code of "1,1". In the next bit period, assuming that the two samples of NRZ data equal "0,1" (i.e., an error or mismatch), the state machine will transition from state B to state A and then to state C, thus outputting the CMI coded pair of "0,0". This does not result in a code violation as the CMI coded pair of "1,1" was previously output for the NRZ data input value of "1".

The above examples represent the two possible outcomes (i.e., transmit a code violation or the proper CMI code) that can occur when the CMI encoder 20 encounters errors or mismatches in the two samples of NRZ data during a single bit period. Although the encoder cannot determine which one of the two samples is correct, the encoder will, on average, select the correct value fifty percent of the time. Therefore, on average, the number of code violations transmitted or output by the CMI encoder will be approximately fifty percent of the total number of errors detected by the encoder. It is important to note that the illegal CMI code of "1,0" is never output by the encoder.

There has thus been shown and described a novel CMI encoder with and without error coding capabilities which fulfills all of the objects and advantages sought therefore. Many changes, modifications, and variations, and other uses in application of the subject invention will, of course, become apparent to those skilled in the art after considering the specification and the accompanying drawings which disclose preferred embodiments thereof. All such changes, modifications, variations, and other uses in applications which do not depart from the spirit and scope of the invention are deemed to be covered by the invention which is limited only by the claims which follow.

The CMI encoder disclosed hereinabove is especially well suited for fiber-optic transmission. However, it will be clearly apparent to those of ordinary skill in the art that there are several other uses and applications of the subject invention without departing from the spirit and scope of the invention as defined by the following claims.

TABLE 1

| CLK | P.S. | | | | I | | N.S. | | | O |
|---|---|---|---|---|---|---|---|---|---|---|
| | | B0 | B1 | B2 | | | B0 | B1 | B2 | |
| ↑ | A | 0 | 0 | 0 | 0 | B | 1 | 0 | 1 | 1 |
| | | 1 | 1 | 1 | | | 0 | 1 | 0 | |
| | | 0 | 0 | 0 | 1 | C | 1 | 0 | 0 | 0 |
| | | 1 | 1 | 1 | | | 0 | 1 | 1 | |
| ↓ | B | 1 | 0 | 1 | 0 | A | 1 | 1 | 1 | 0 |
| | | 0 | 1 | 0 | | | 0 | 0 | 0 | |
| | | 1 | 0 | 1 | 1 | A | 1 | 1 | 1 | 0 |
| | | 0 | 1 | 0 | | | 0 | 0 | 0 | |
| ↓ | C | 1 | 0 | 0 | 0 | E | 1 | 0 | 0 | 0 |
| | | 0 | 1 | 1 | | | 0 | 1 | 1 | |
| | | 1 | 0 | 0 | 1 | D | 1 | 1 | 0 | 1 |
| | | 0 | 1 | 1 | | | 0 | 0 | 1 | |
| ↑ | D | 1 | 1 | 0 | 0 | X | 0 | 1 | 1 | X |
| | | 0 | 0 | 1 | | | 1 | 0 | 0 | |
| | | 1 | 1 | 0 | 1 | B | 0 | 1 | 0 | 1 |
| | | 0 | 0 | 1 | | | 1 | 0 | 1 | |
| ↑ | E | 1 | 0 | 0 | 0 | F | 0 | 0 | 1 | 1 |
| | | 0 | 1 | 1 | | | 1 | 1 | 0 | |
| | | 1 | 0 | 0 | 1 | X | 0 | 0 | 0 | X |
| | | 0 | 1 | 1 | | | 1 | 1 | 1 | |
| ↓ | F | 0 | 0 | 1 | 0 | E | 0 | 1 | 1 | 0 |
| | | 1 | 1 | 0 | | | 1 | 0 | 0 | |
| | | 0 | 0 | 1 | 1 | D | 0 | 0 | 1 | 1 |
| | | 1 | 1 | 0 | | | 1 | 1 | 0 | |

X — Don't Care

TABLE 2

| CLK | P.S. | | | | I | | N.S. | | | O |
|---|---|---|---|---|---|---|---|---|---|---|
| | | B0 | B1 | B2 | | | B0 | B1 | B2 | |
| ↑ | A | 0 | 0 | 0 | 0 | B | 1 | 0 | 1 | 1 |
| | | 1 | 1 | 1 | | | 0 | 1 | 0 | |
| | | 0 | 0 | 0 | 1 | C | 1 | 0 | 0 | 0 |
| | | 1 | 1 | 1 | | | 0 | 1 | 1 | |
| ↓ | B | 1 | 0 | 1 | 0 | A | 1 | 1 | 1 | 0 |
| | | 0 | 1 | 0 | | | 0 | 0 | 0 | |
| | | 1 | 0 | 1 | 1 | A | 1 | 1 | 1 | 0 |
| | | 0 | 1 | 0 | | | 0 | 0 | 0 | |
| ↓ | C | 1 | 0 | 0 | 0 | E | 1 | 0 | 0 | 0 |
| | | 0 | 1 | 1 | | | 0 | 1 | 1 | |
| | | 1 | 0 | 0 | 1 | D | 1 | 1 | 0 | 1 |
| | | 0 | 1 | 1 | | | 0 | 0 | 1 | |
| ↑ | D | 1 | 1 | 0 | 0 | F | 1 | 1 | 0 | 1 |
| | | 0 | 0 | 1 | | | 0 | 0 | 1 | |
| | | 1 | 1 | 0 | 1 | B | 0 | 1 | 0 | 1 |
| | | 0 | 0 | 1 | | | 1 | 0 | 1 | |
| ↑ | E | 1 | 0 | 0 | 0 | F | 0 | 0 | 1 | 1 |
| | | 0 | 1 | 1 | | | 1 | 1 | 0 | |
| | | 1 | 0 | 0 | 1 | B | 1 | 0 | 1 | 1 |
| | | 0 | 1 | 1 | | | 0 | 1 | 0 | |
| ↓ | F | 0 | 0 | 1 | 0 | E | 0 | 1 | 1 | 0 |
| | | 1 | 1 | 0 | | | 1 | 0 | 0 | |
| | | 0 | 0 | 1 | 1 | D | 0 | 0 | 1 | 1 |
| | | 1 | 1 | 0 | | | 1 | 1 | 0 | |

TABLE 3

| | PERFORMANCE SUMMARY | | |
|---|---|---|---|
| | % SENT AS ERRORS | % SENT AS ILLEGAL CODES | % ENCODED AS CODE VIOLATIONS |
| U.S. Pat. No. 5,113,187 | 100% | 50% | 50% |
| CMI Encoder FIG. 4 | 50% | 0% | 50% |
| CMI Encoder FIG. 2 | 33% or 67% | 67% | 33% |

What is claimed is:

1. An apparatus for encoding non-return-to-zero (NRZ) data into Coded Marked Inversion (CMI) format comprising:

a clock which generates a clock signal of a predetermined period;

input means, coupled to said clock, for sampling said NRZ data during each period of the clock signal; and a state machine, coupled to said input means for receiving samples of said NRZ data, and encoding said samples of NRZ data into CMI format, said state machine having a set of legal states and zero illegal states, and comprising first means for producing in response to the sampling of said NRZ data a first value during a first predetermined number of the legal states; and second means for producing in response to the sampling of said NRZ data and said first value, a second value during a second predetermined number of the legal states, wherein said first and second values represent the sample of NRZ data in CMI format.

2. The apparatus as defined by claim 1, wherein said input means samples said NRZ data twice during each period of the clock to produce a first half sample and second half sample of said NRZ data.

3. The apparatus as defined by claim 2, wherein said first and second means of said state machine are responsive to said first and second half samples, respectively, for producing said first and second values.

4. The apparatus as defined by claim 2, further comprising means for detecting errors in said NRZ data by comparing said first half sample and said second half sample.

5. The apparatus as defined by claim 4, further comprising means for producing an output with information proportionate to the number of errors detected.

6. The apparatus as defined by claim 4, wherein said state machine outputs code violations proportional to the number of errors detected.

7. The apparatus as defined by claim 1, wherein each of said first and second predetermined numbers equals three.

8. The apparatus as defined in claim 1, further comprising error encoding circuitry coupled to said state machine, said error encoding circuitry detecting errors in said NRZ data.

9. A method of encoding non-return-to-zero (NRZ) data into Coded Marked Inversion (CMI) format comprising the steps of:

providing a clocking signal having a predetermined period;

obtaining a first sample of said NRZ data during said predetermined period;

producing a first value in accordance with said first sample;

obtaining a second sample of said NRZ data during said predetermined period;

producing a second value in accordance with said first value and said sample; and combining said first and second values to generate a CMI coded value, and outputting said CMI coded value.

10. The method as defined by claim 9, wherein said first and second samples are obtained during first and second halves of said predetermined period, respectively.

11. The method as defined by claim 9, further comprising steps of:

comparing said first and second samples of NRZ data;

detecting differences between said first and second samples; and generating an error signal when said first sample of NRZ data is different from said second sample.

12. The method as defined by claim 11, further comprising the steps of: outputting information within said CMI coded value indicative of the number of errors detected in said detecting step.

13. The method as defined by claim 12, wherein said information equals CMI code violations.

14. The method as defined by claim 9, wherein said CMI coded values comprises 0,0; 0,1; and 1,1.

15. The method as defined by claim 9, wherein said CMI coded values consist of: 0,0; 0,1; and 1,1.

16. An apparatus for encoding non-return-to-zero (NRZ) data into Coded Marked Inversion (CMI) format comprising:

a clock for providing a clock signal having a predetermined period; and a state machine responsive to said clock signal for receiving at least one sample of said NRZ data, said state machine having zero illegal states and a predetermined number of legal states, each of said legal states outputting a first or second value in response to said at least one sample of NRZ data, said state machine being operative to transition between different ones of said predetermined number of legal states to produce a combination of said first and second values, said combination represents said at least one sample of NRZ data in CMI format.

17. The apparatus as defined by claim 16, wherein said state machine comprises three or less storage elements.

18. The apparatus as defined by claim 17, wherein said storage elements are flip-flops.

19. The apparatus as defined by claim 16, wherein said state machine outputs two samples of said NRZ data during each clock period, and wherein said state machine is responsive to said two samples for producing said combination of said first and second values in which said combination represents said two samples of NRZ data in CMI format.

20. The apparatus as defined by claim 16, further comprising error decoding circuitry coupled to said said state machine, said error decoding circuitry being operative to detect errors in said NRZ data.

21. The apparatus as defined by claim 16, wherein said state machine outputs two samples of said NRZ data during each clock period, said apparatus further comprising error decoding circuitry coupled to said input and said state machine, said error decoding circuitry being operative to detect errors in said NRZ data by comparing said two samples of NRZ data.

22. The apparatus as defined by claim 19, wherein said state machine outputs information indicative of the number of errors detected by said error decoding circuitry.

23. The apparatus as defined by claim 22, wherein said information is in the form of one or more of CMI code violations and CMI illegal codes.

* * * * *